United States Patent
Bai et al.

(10) Patent No.: US 10,883,625 B2
(45) Date of Patent: Jan. 5, 2021

(54) HANDLE ASSEMBLY AND A FAUCET WITH THE SAME

(71) Applicants: XIAMEN LOTA INTERNATIONAL CO., LTD., Xiamen (CN); LOTA XIAMEN INDUSTRY CO., LTD., Xiamen (CN)

(72) Inventors: Shuanglin Bai, Xiamen (CN); Liming Ye, Xiamen (CN); Jianping Zhou, Xiamen (CN)

(73) Assignees: XIAMEN LOTA INTERNATIONAL CO., LTD., Xiamen (CN); LOTA XIAMEN INDUSTRY CO., LTD., Xiamen (CN)

( * ) Notice: Subject to any disclaimer, the term of this patent is extended or adjusted under 35 U.S.C. 154(b) by 0 days.

(21) Appl. No.: 16/367,979

(22) Filed: Mar. 28, 2019

(65) Prior Publication Data
US 2020/0088317 A1 Mar. 19, 2020

(51) Int. Cl.
*F16K 31/60* (2006.01)
(52) U.S. Cl.
CPC .................... *F16K 31/602* (2013.01)
(58) Field of Classification Search
CPC ...... F16K 31/602; F16K 31/605; F16K 31/60; Y10T 137/0491; E03C 1/0412
USPC .................. 137/539, 359; 251/293
See application file for complete search history.

(56) References Cited

U.S. PATENT DOCUMENTS

| | | | | |
|---|---|---|---|---|
| 1,989,083 A | * | 1/1935 | Dahnken | F16K 31/60 403/288 |
| 5,257,645 A | * | 11/1993 | Scully | E03C 1/04 137/359 |
| 5,531,524 A | * | 7/1996 | Brouwer | F16C 17/08 384/125 |
| 5,826,788 A | * | 10/1998 | Redding | F16C 17/02 251/355 |
| 5,947,149 A | | 9/1999 | Mark et al. | |
| 6,195,840 B1 | * | 3/2001 | Pilatowicz | F16K 31/607 16/441 |
| 6,854,920 B2 | * | 2/2005 | Romero | E03C 1/04 16/441 |
| 9,062,796 B2 | * | 6/2015 | Horsman | F16K 31/602 |
| 9,328,488 B2 | * | 5/2016 | Van Leyen | E03C 1/0412 |

* cited by examiner

*Primary Examiner* — Angelisa L. Hicks
(74) *Attorney, Agent, or Firm* — Zhong Law, LLC

(57) ABSTRACT

The present disclosure relates to the field of fluid switch, and in particular, to an handle assembly and a faucet with the same, wherein the handle assembly comprises a handle including a handle rod; a handle housing which has an inner cavity and a through-hole, and the through-hole is defined by an inner wall which is formed by the handle housing extending towards the inner cavity from its one end, the through-hole is configured to be tapered at a transition position where the inner wall connects the handle housing, and the handle rod is rotatably fitted into the though-hole; a first wear-resistant member which is elastic and received in an accommodating area formed by a transition part of the through-hole and the handle rod; and a second wear-resistant member which is engaged to the handle rod and rests against the inner wall so that the handle rod and the handle housing are positioned on the same plane by suffered the limitation of the second wear-resistant member after making the handle rod and the handle housing in place.

12 Claims, 7 Drawing Sheets

HANDLE ASSEMBLY AND A FAUCET WITH THE SAME

CROSS-REFERENCE TO RELATED APPLICATIONS

This application claims priority to Chinese application No. CN 201811079767.2, filed Sep. 17, 2018, which is hereby incorporated by reference as though fully set forth herein.

TECHNICAL FIELD

The present disclosure relates to the technical field of fluid switch, and in particular, to a handle assembly and a faucet with the same.

BACKGROUND

A faucet is a switch used to control the fluid flow. Usually, when the faucet is being fitted, it can be deployed in a gapless fit manner so that there is no large gap between the handle and the panel because the gap may produce an unpleasing appearance. However, this gapless fit has a stringent requirement for the flatness of the panel and the wall space. Once placed in the case of a wall space with inadequate flatness, it is difficult for the existing faucet device to achieve the gapless fit. Moreover, the gapless fit can cause a large friction between the handle and the panel, which will affect their service lives. One of the existing technologies provides a wear-resistant bushing as disclosed in the U.S. Pat. No. 5,947,149, which provides a non-visible faucet handle connection, where the wear-resistant bushing is received in the handle shell, and the handle and the handle shell is separated by a flange. In conjunction, a snap ring is provided to elastically support the handle shell and the wear-resistant bushing, thus achieving the gapless fit between the handle and the panel. However, this implementation requires a wear-resistant member fine-processed when the faucet is being fitted, and once assembled, the wear-resistant member is unable to be removed and replaced because the snap ring cannot be freed after it snaps into the recess, and the above-mentioned case results in that the faucet cannot be tuned when the assembling errors (for example, the fitting is too loose or too tight) occur, thereby affecting the feel experience of the user. Furthermore, this faucet can also waggle when it is used, and it has a complicate procedure for assembly because of too many components used, which is not conducive to improving the productivity.

Therefore, in the technical field of fluid switch, there is a need for a handle assembly and a faucet with the same which include fewer components, well abrasion resistance and anti-waggle performance, and more preferably, the assembly and the panel can be engaged in a manner of gapless fit.

SUMMARY OF THE DISCLOSURE

Therefore, it is an object of the present disclosure to provide a handle assembly and a faucet with the same, thereby overcoming the above-identified and other disadvantages of the existing technology.

To implement above object, according to one aspect of this disclosure, the disclosure provides a handle assembly, which comprises: a handle which comprises a handle rod; a handle housing which has an inner cavity and a through-hole, the through-hole is defined by an inner wall which is formed by the handle housing extending towards the inner cavity from its one end, and the through-hole is configured to be tapered at a transition position where the inner wall connects the handle housing, the handle rod is rotatably fitted into the though-hole; a first wear-resistant member which is elastic and received in an accommodating area formed by a transition part of the through-hole and the handle rod; a second wear-resistant member which is engaged to the handle rod, resting against the inner wall so that the handle rod and the handle housing are positioned on the same plane by being required to meet the limitation of the second wear-resistant member after arranging the handle rod and the handle housing in place.

Preferably, the through-hole is configured to have an inclined angle ranging from 30° to 60° with respect to the inner wall at the transition position.

Preferably, the first wear-resistant member is configured to be compressed with a volume ratio of a range between 60% and 80% with respect to the accommodating area during the rotation of the handle with respect to the handle housing.

Preferably, the handle assembly further comprises an absorber which is disposed between the handle rod and the through-hole and is configured to reduce the rotational friction between the handle rod and the through-hole.

Preferably, the handle rod is provided with an annular recess at the position opposite to the transition part, and the annular recess and the transition part define the accommodating area together.

Preferably, the handle assembly further comprises a fastener, where the fastener is engaged with the handle rod, and the wear-resistant member rests against the inner wall by the fastener with respect to the handle housing.

Preferably, the handle further includes a handle member and the handle member connects the handle rod at an angle in order to drive the handle rod to rotate in the through-hole, and the handle rod and the handle member are configured as one piece member or separate pieces.

According to another aspect of the disclosure, the disclosure further provides a faucet, comprising: an assembly as described hereinbefore; a panel which has an opening; a body assembly which comprises a body, a valve member accommodated in the body and a valve cover, the valve cover is engaged with the body and forms an accommodating cavity for receiving the valve member with the body together; the handle housing is adjustably engaged with the valve cover through the opening of the panel, and the handle rod is engaged to the valve member to control the valve member to an open position and a close position.

Preferably, a valve lever of the valve member is engaged to the handle rod and configured to rotate following the handle rod to control the shut off of the fluid in the body.

Preferably, the valve lever is connected to the handle rod by a spline.

A part of other features and advantages of the present disclosure will be apparent to the skilled person in the art after reading the disclosure, while the other part will be described in the following specific embodiment in combination with the drawings.

BRIEF DESCRIPTION OF DRAWINGS

Hereinafter, the embodiments of the present disclosure will be described in detail in combination with drawings, wherein.

DETAILED DESCRIPTION

Figure 1:
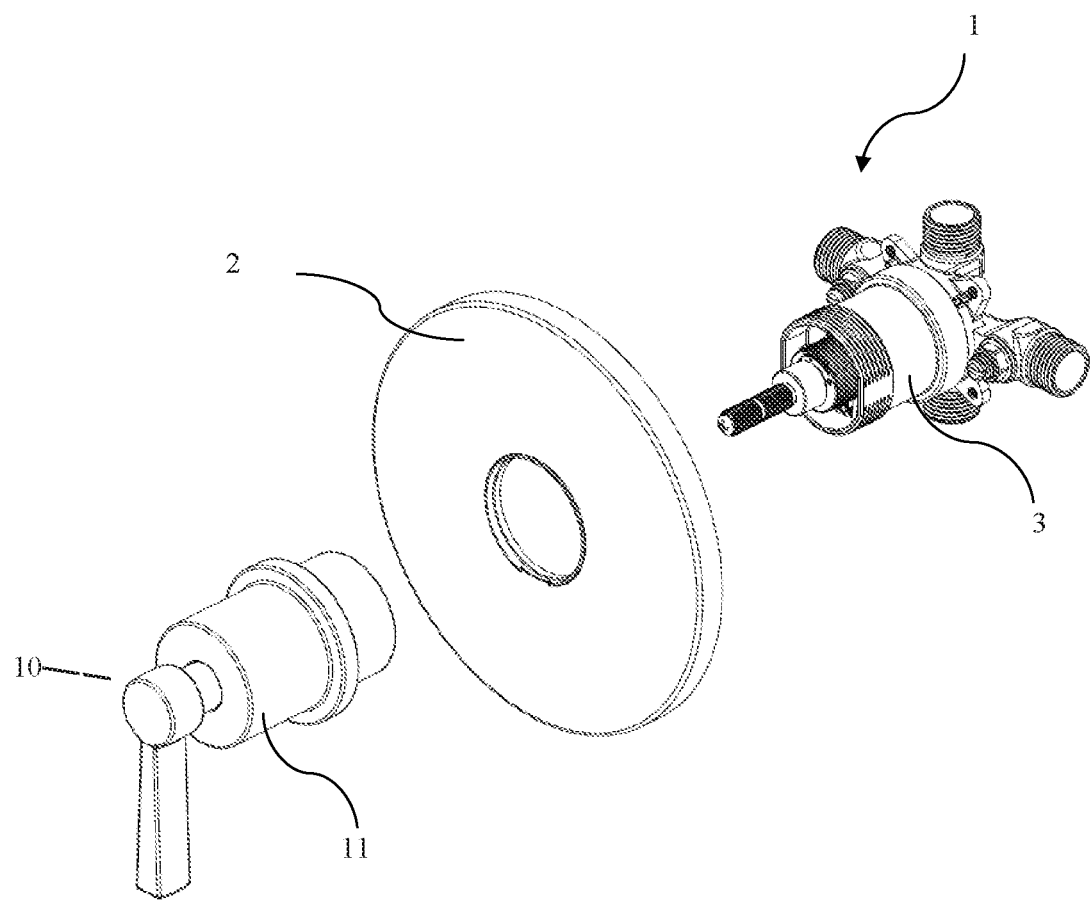
FIG. 1 is an exploded schematic view of the faucet according to the disclosure.
Figure 2:
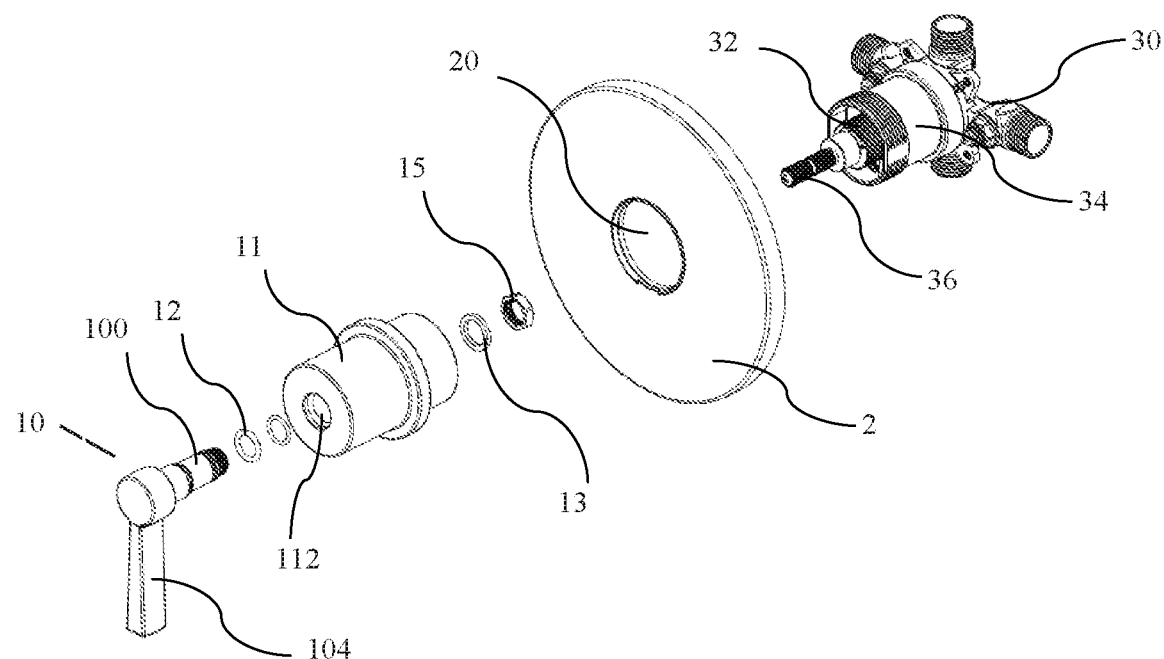
FIG. 2 is another exploded schematic view of the faucet according to the disclosure.

Now the schematic solutions of the extractable faucet disclosed by the present disclosure will be described in detail with reference to the drawings. Although some drawings are provided to illustrate some embodiments of the present disclosure, these drawings may not necessarily be depicted in scale, and some features may be enlarged, removed or cut off in part to show and explain the disclosure of the present disclosure better. The positions of some elements in the drawings may be adjusted as desired without influencing the technical effect. The phrase "in the drawings" or the like presented in the description may not refer to all the drawings or examples.

Some orientation terms, e.g. "inner", "outer", "upper", "lower" and other orientation terms, as used hereinafter for describing the drawings will be understood as having their normal meanings and indicating those directions as involved when the drawings are viewed normally. Basically, the orientation terms as stated in the present specification will be interpreted according to the routine directions as understood by the skilled person in the art, unless otherwise specified.

The terms "first", "the first", "second", "the second" and the like as used in the disclosure do not represent any order, amount or importance in this disclosure, but rather are used to differentiate one element from other elements.

Figure 3:
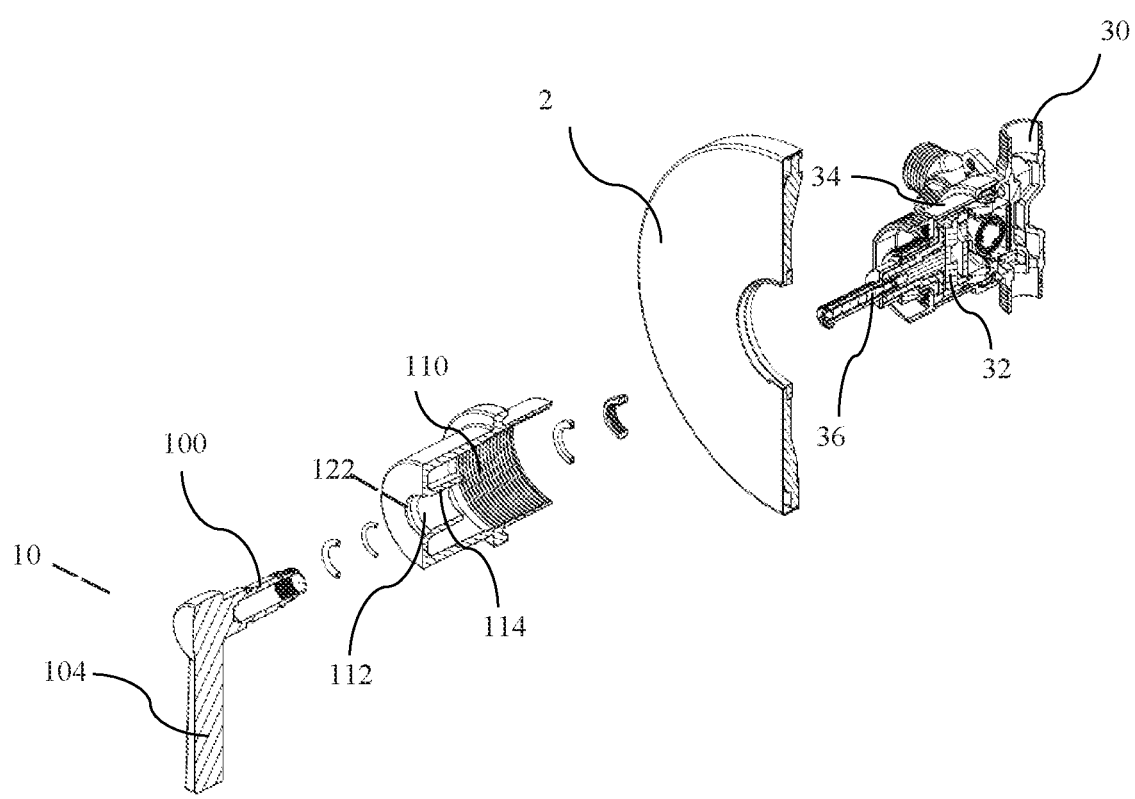
FIG. 3 is an exploded cross section view of the faucet according to the disclosure.
Figure 4:
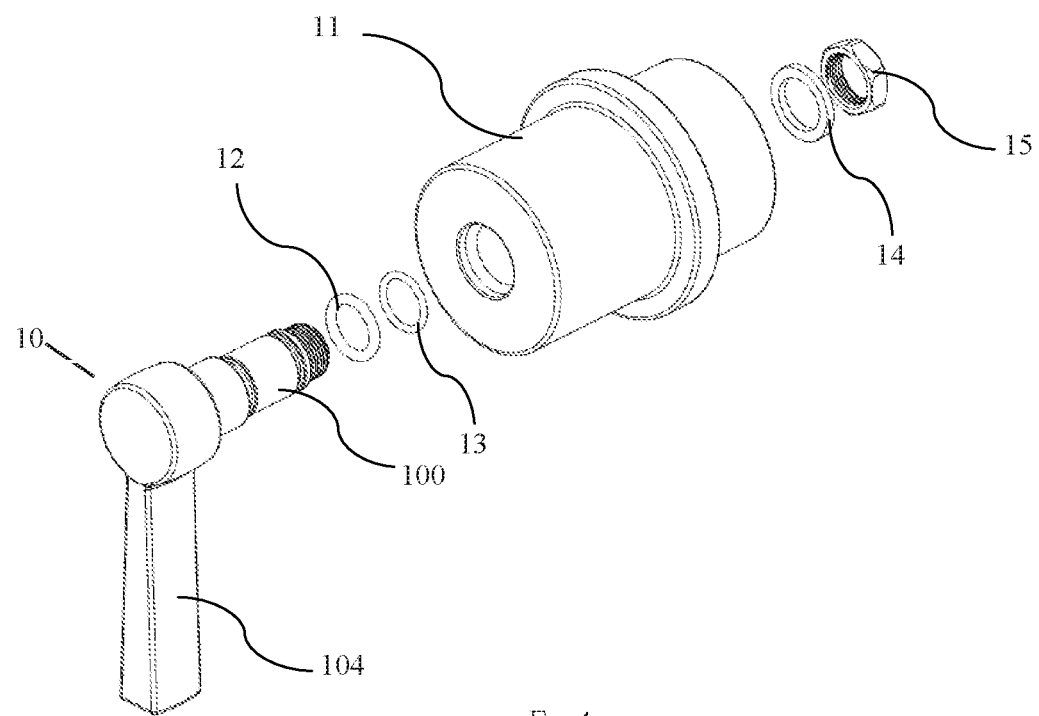
FIG. 4 is an exploded view of the handle assembly according to the disclosure.
Figure 5:
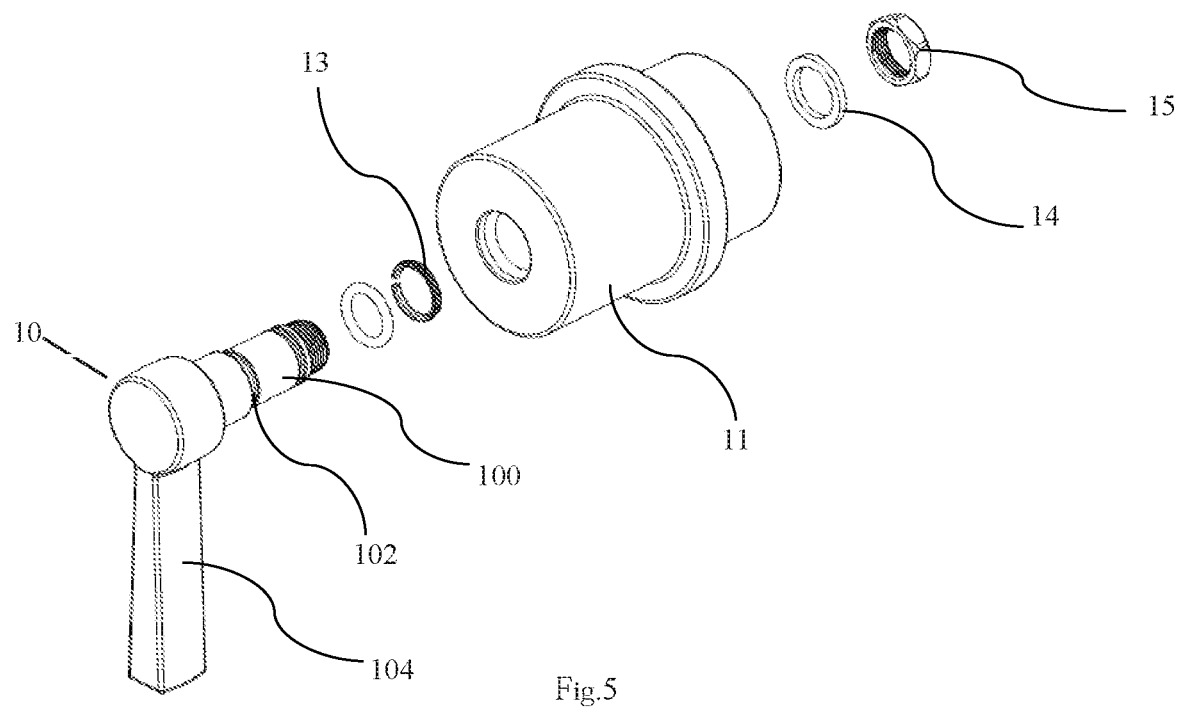
FIG. 5 is another exploded view of the handle assembly according to the disclosure.
Figure 6:
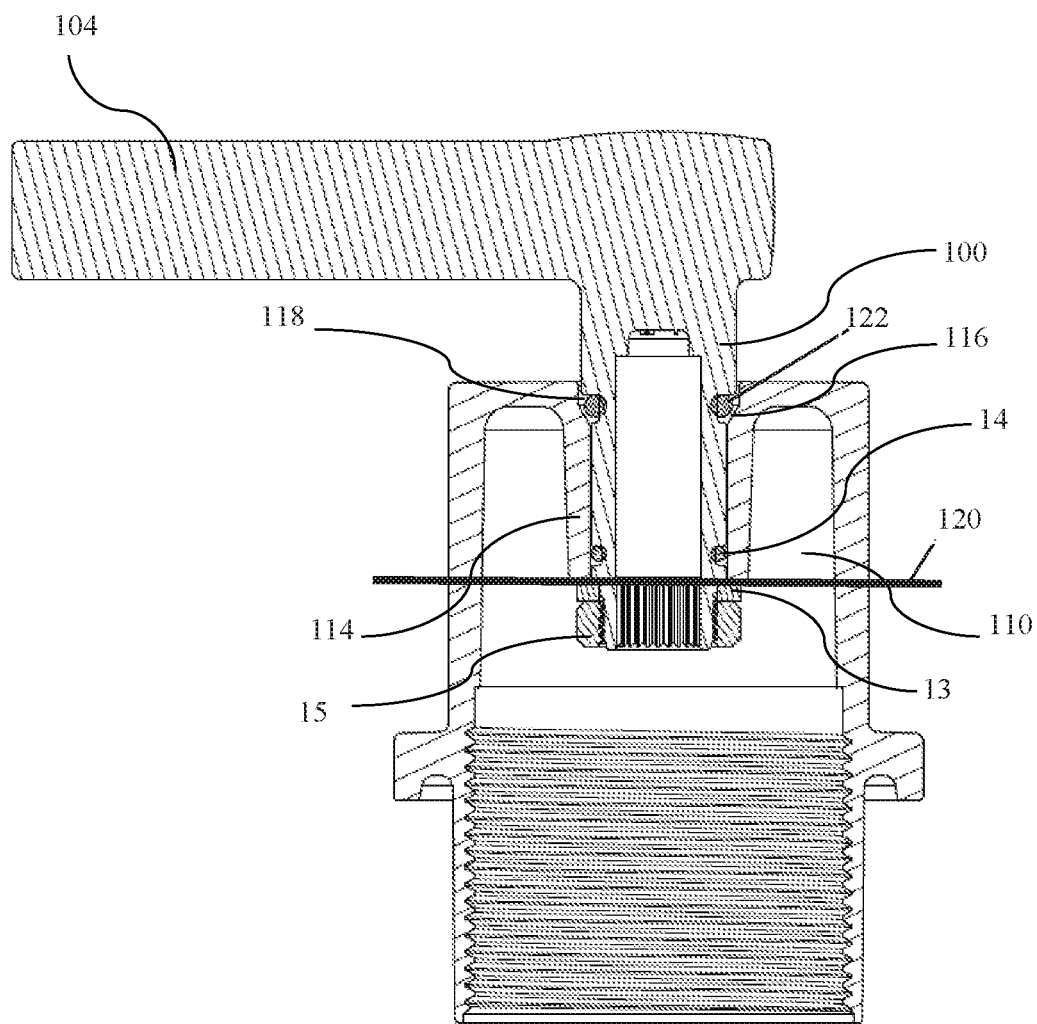
FIG. 6 is a cross section view of the handle assembly according to the disclosure.
Figure 7:
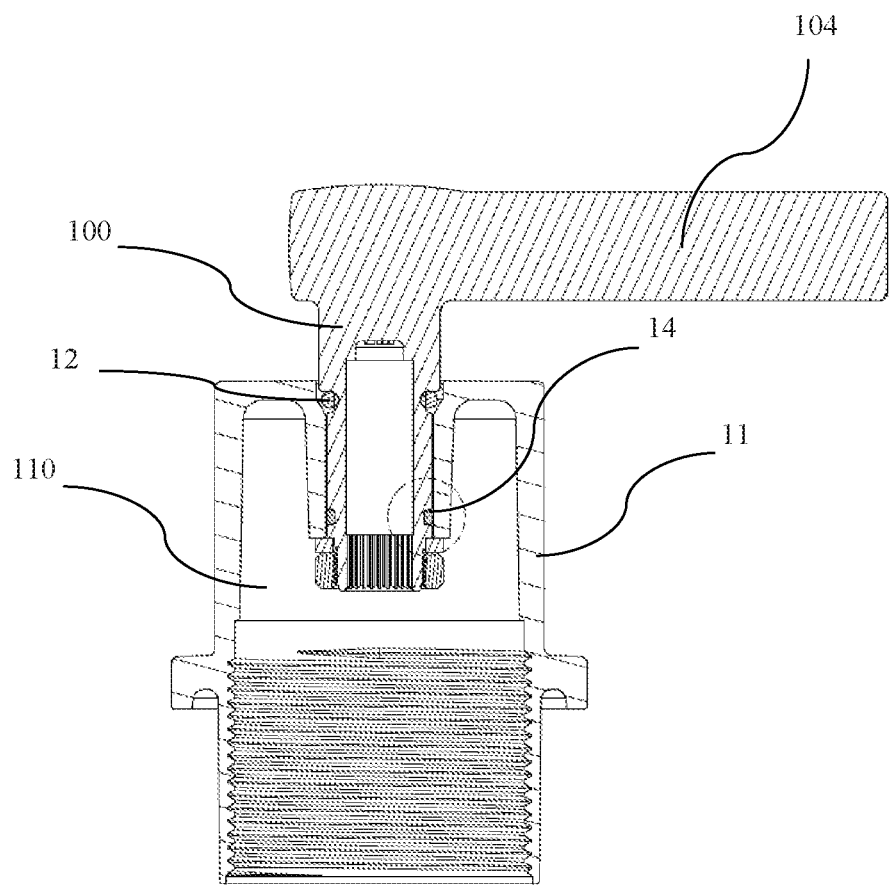
FIG. 7 is another cross section view of the handle assembly according to the disclosure.
Figure 8:
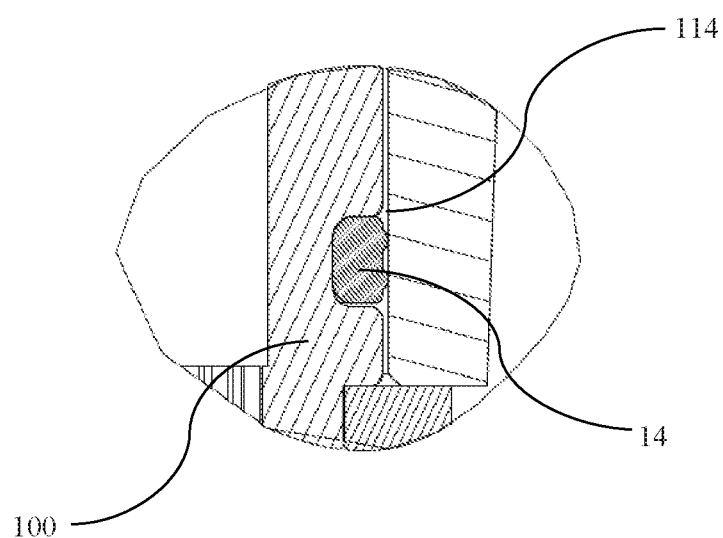
FIG. 8 is a partial enlarged view of the FIG. 7.
Figure 9:
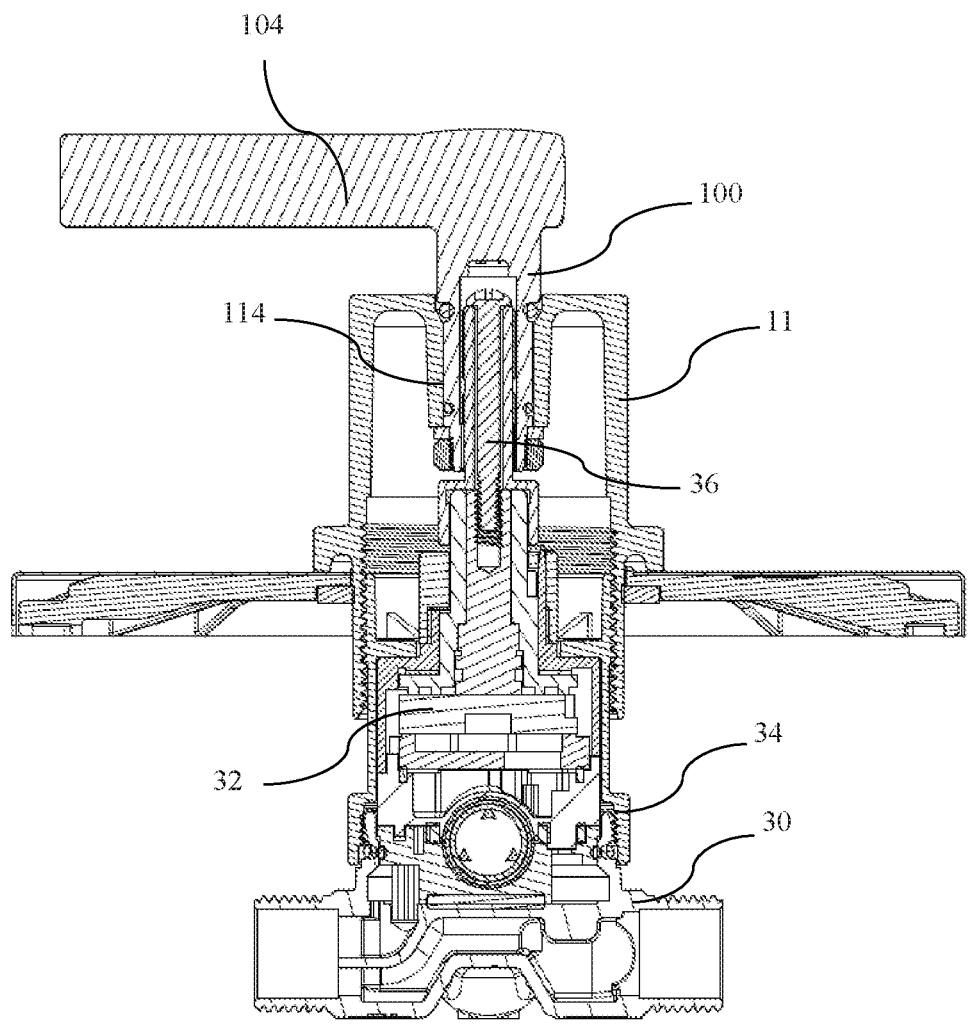
FIG. 9 is a cross section view of the faucet according to the disclosure.

As shown in FIGS. 1 to 9, this disclosure provides a handle assembly 1, which comprises a handle 10, a handle housing 11, a first wear-resistant member 12 and a second wear-resistant member 13. Specifically, the handle housing 11 may be configured to be a columnar shell member. With reference to FIG. 3, the handle housing 11 has an inner cavity 110 and a through-hole 112 located generally at the central position of the handle housing 11. With reference to the FIG. 2, the through-hole 112 is defined by an inner wall 114 which is formed by the handle housing 11 extending towards the inner cavity 110 from its one end, and the through-hole 112 has a certain taper at a transition position 122 where the inner wall 114 connects the handle housing 11 (that is, the through-hole is configured to be tapered towards the interior of the inner cavity 110). The handle 10 comprises a handle rod 100, which is rotatably fitted into the through-hole 112. The handle 10 located in the through-hole 112 can rotate with respect to the through-hole 112, and control a valve member 32 described hereinafter coordinately for implementing the shut off of fluid. In terms of the friction which may be generated at the transition position 122 of the handle housing 11 when the handle rod 100 rotates in the through-hole 112 will shorten the service life of the handle housing 11 and the handle rod 100, this disclosure provides the first wear-resistant member 12 (such as a wear-resistant o-ring), which is elastic and received in an accommodating area 118 formed by a transition part 116 of the through-hole 112 and the handle rod 100 (which is conformal to the tapered shape of the transition part 116) with reference to FIG. 6. The second wear-resistant member 13 (such as a wear-resistant spacer) can separate the fastener 15 described hereinafter from the lower end surfaces of the handle housing 11 and the handle rod 100 which are located in the inner cavity when the handle rod 100 rotates with respect to the handle housing 11, so as to reduce the rotational friction possibly generated between the fastener 15 and the handle rod as well as the handle housing, and thus prolonging the service lives of the handle rod 100 and the handle housing 11. Specifically as described hereinafter, after making the handle rod 100 and the handle housing 11 in place, the handle rod 100 and the handle housing 11 are positioned on the same plane 120 (with reference to FIG. 6) by being required to meet the limitation of the second wear-resistant member 13, which can avoid that the thickness tolerance dimension of the second wear-resistant member (i.e., the wear-resistant spacer) influence the accumulated tolerance of the dimension chain after fitting, and therefore improving the hand feeling in operation after the handle assembly is fitted while reducing the machining precision between the handle rod 100 and the handle housing 11.

To achieve gapless fit between the handle 10 and the panel 2, the handle assembly 1 of this disclosure satisfies the rotational wear-resistant requirements for the handle rod 100 and the handle housing 11 by utilizing fewer components with simple structures and prolongs the service lives of the handle rod and the handle housing. Because the components have simple structures and low machining precision, and can be removed with respect to the handle rod 11 and the handle housing 110, the handle rod 100 and the handle housing 11 can be tuned repeatedly to deal with assembling error until they conform to the use standard. Accordingly, the handle assembly provides good experience for users. Furthermore, the handle assembly 1 with simplified structure makes the assembled procedures easier and facilitates to improve production efficiency.

In order to better receive the first wear-resistant member 12 and reduce the abrasion between the handle rod 100 and the handle housing 11 when they rotate with respect to each other, the through-hole 112 is preferably formed with an inclined angle ranging from 30° to 60° with respect to the inner wall 114 at the transition position 122 of the inner wall 114 and the handle housing 11, as shown in FIG. 3. The inclined angle provides an accommodating area 118 for the first wear-resistant member 12, facilities the first wear-resistant member 12 to support the handle rod 100 with its elasticity when it receives the rotational force applied by the handle rod 100, and avoids the handle rod contacting the inner wall 114 directly, which will result in a severe abrasion generated between the handle rod 100 and the handle housing 11.

While rotating the handle rod 100 with respect to the handle housing 11, the first wear-resistant member 12 is compressed under the force applied by the rotational handle rod 100.

The cross section area of the first wear-resistant member 12 is in the range between 60% and 80% of the cross section of the accommodating area 118 during compression. Specifically, as seen from the FIGS. 4-6, when the handle rod 100 is fitted into the through-hole 112, the handle rod 100 is provided with an annular recess 102 at the position opposite to the transition part 116. The annular recess 102 and the transition part 116 may together define the accommodating area 118. The ratio of the cross section between the compressed first wear-resistant member 12 and the accommodating area 118 make the first wear-resistant member 12 in a better compression configuration in order to make sure that the handle rod 100 and the handle housing 11 rotate without contacting at the transition position 122.

In addition, in order to avoid the waggle of the handle rod 100 when the handle rod 100 rotates in the through-hole 112, optionally, the handle assembly 1 further includes an absorber 14. As shown in FIGS. 4-6 and 8, in a particular embodiment, the absorber 14 may be an absorber spacer which is made of wear-resistant rubber or wear-resistant plastic (such as polytetrafluoroethylene). The absorber 14 is disposed between the handle rod 100 and the through-hole 112, resting against the inner wall 114 forming the through-hole 112 when the handle rod 100 rotates in the through-hole 112, so that there is a smaller gap between the handle rod 100 and the inner wall 114. This gap causes the handle 10 to be out of contact with the inner wall 114 but does not cause visible waggles when the handle 10 rotates in the through-hole 112. In another embodiment, the absorber 14 may be configured in a manner similar to a damped ball bearing. The balls are embedded at the circumference of the handle rod 100, and a resilient spacer is provided between the balls and the handle rod 100, in this way, the damping effect can be achieved, and the rotational friction of the handle rod 100 with respect to the handle housing 11 can be reduced while the handle rod 100 is rotated with respect to the hand sheath 11, and thus making their relative rotation more flexible. Certainly, it is conceivable by the skilled in the art, in the case of overcoming the waggle issues of the handle 10 during the rotation, for example, lubricant may also be used between the inner wall 114 and the handle rod 100 in order to reduce the friction and the abrasion between the handle rod 100 and the handle housing 11.

The handle assembly 1 of this disclosure further comprises fastener(s) 15. As shown in the FIGS. 4-6, the fastener 15, for example, is engaged with the handle rod 100 with a screw thread. The fastener 15 may be configured to be screw nut(s), and the handle rod 100 is provided with male screw at its one end moving deep into the inner cavity, where the positioning of the handle rod 100 with respect to the handle housing 11 is achieved by connecting the screw nut to the handle rod 100. As the skilled in the art known, other engagement manners also fall into the scope of this disclosure. One side of the handle rod 100 opposite to the second wear-resistant member 13 has a diameter larger than that of the center bore of the second wear-resistant member 13. As shown in the FIG. 7, the fastener 15 compresses the second wear-resistant member 13, and the second wear-resistant member 13 rest against one end of the inner wall 114 away from the transition part 116 and the handle rod 100, so that the second wear-resistant member 13 is unable to rotate when the handle rod 100 rotate with respect to the handle housing 11, while the compress force suffered by the second wear-resistant member 13 with elasticity is transmitted to handle rod 100 so as to avoid the waggle of the handle rod 100 possibly generated in the through-hole 112. Under the limitation of the second wear-resistant member 13, the main rotational portion of the handle rod 100 with respect to the handle housing 11 and the handle housing 11 are positioned on the same plane 120 (as shown in the FIG. 6), helping avoid accumulated tolerance caused by the machining differences of the second wear-resistant member, and thus reducing the need for machining precision of the handle housing 11.

For saving the labor effort to rotate the handle rod 100, the handle 10 of this disclosure further includes a handle member 104 and the handle member 104 connects the handle rod 100 at an angle, generally at a right angle. In the operation of users, the handle member 104 is able to drive the handle rod 100 to rotate in the through-hole 112, and the handle rod 100 and the handle member 104 can be configured as one-piece member or separate pieces. When the handle rod 100 and the handle member are separate pieces, the skilled in this art can utilize the known connection mechanisms to connect them, such as screws, snap-fit and so on.

The aforesaid handle assembly 1 can be applied in the field of faucet. The disclosure provides a faucet with the above-mentioned handle assembly 1, and the faucet further comprises a panel 2 and a body assembly 3. Wherein, the body assembly 3 with reference to FIGS. 2, 3, and 9, includes body 30, valve member 32 and valve cover 34. The body 30, in its interior, is configured with flow paths for the inflow and outflow of the fluid (such as hot fluid, cold fluid) and cavity receiving the valve member 32. The body 30 further has shut-off valves which are provided at the fluid inflow section for the inflow of the cold fluid and the hot fluid. When repaired, the shut-off valve is closed and the inflow and the outflow of the cold fluid and the hot fluid can be prevented, and when used normally, the shut-off valve can act as a one-way valve to prevent the backflow of the cold fluid and the hot fluid. The valve member 32 is used to control the shut off of the fluid in the body 30, furthermore, the valve member 32 also has a function to mix the cold fluid and the hot fluid to a suitable temperature. When fitted, the valve member 32 is disposed in the cavity of the body 30, and the valve cover 34 is engaged with the body 30 to receive the valve member 32 therein. The handle housing 11 is engaged to the valve cover 34 through the opening 20 of the panel 2 (for example, the valve cover 34 with male screw is engaged to the handle housing 11 with female screw by the screw engagement). The handle housing 11 has a flange at its circumference, and the flange will rest against the panel 2 when the handle housing 11 goes through the opening 20 of the panel 2. After the handle housing 11 is engaged to the valve cover 34 at a suitable length with accordance to the installation demands, the panel is adaptively pressed against such as a wall. The valve lever 36 of the valve member 32 exposes from the valve cover 34 and is engaged with the handle rod 100, so as to achieve controlling the opening and closing of the valve member 32 by rotating the handle 10. The handle rod 100 is provided with a spline groove at its one end moving deep into the inter cavity 110, and the valve lever 36 is configured to be a spline shaft. The rotational force suffered by the handle rod 100 can be transmitted to the valve lever 36 by the cooperation between the spline groove and the spline shaft, thereby controlling the shut off the fluid in the body 30 by controlling the opening and closing of the valve member 32.

The handle assembly and the faucet with the same satisfy the rotational wear-resistant requirements for the handle rod and the handle housing by utilizing fewer components with simple structures and prolong their service lives. The handle assembly with the simple structure makes the assembled procedures easier and facilitates to improve production efficiency, moreover, there are lower machining precision requirements for the wear sheath by adjusting the position of the wear-resistant member. The replaceable and detachable wear-resistant member is able to satisfy multiple alignment requirements when arising assembling error and achieve the reuse of the handle and the handle housing, and which is not only improving the experience of the user but also achieving cost saving.

Although the disclosure is described through limited quantities embodiments, it is understood that the disclosure is not limited by such disclosed embodiments. Rather, any changes, modifications, replacements or equal devices which are not described previously are incorporated to revise the disclosure, however, which are equivalent to the spirit and scope of the disclosure. Furthermore, while various embodiments of the disclosure have been described, it is understood that the aspect of the disclosure can merely include some of the embodiments. Therefore, the disclosure is not regarded to be limited by the aforesaid description, however it is only limited by the appended claims.

LIST OF REFERENCE NUMERALS

1—handle assembly
10—handle
100—handle rod
102—annular recess
104—handle member
11—handle housing
110—inner cavity
112—through-hole
114—inner wall
116—transition part
118—accommodating area
12—first wear-resistant member
13—second wear-resistant member
14—absorber
15—fastener
2—panel
20—opening
3—body assembly
30—body
32—valve member
34—valve cover
36—valve lever

The invention claimed is:

1. A handle assembly, comprising:
a handle comprising a handle rod;
a handle housing comprising an inner cavity and a through-hole, wherein the through-hole is defined by an inner wall which is formed as an extension of the handle housing towards the inner cavity from its one end, the through-hole is configured to be tapered at a transition position where the inner wall connects the handle housing and the handle rod is rotatably fitted into the through-hole;
a first wear-resistant member which is elastic and received in an accommodating area formed by a transition part of the through-hole and the handle rod;
a second wear-resistant member which is engaged to the handle rod, resting against the inner wall so that the handle rod and the handle housing are terminated on a same plane limited by the second wear-resistant member after placing the handle rod in the handle housing; and
a fastener engaged with the handle rod, wherein the second wear-resistant member rests against the inner wall of the handle housing by the fastener, and the second wear-resistant member is to separate the fastener from lower end surfaces of the handle housing, and the handle rod is located in the inner cavity when the handle rod rotates with respect to the handle housing.

2. The handle assembly according to claim 1, wherein the through-hole is configured to have an inclined angle ranging from 30° to 60° with respect to the inner wall at the transition position.

3. The handle assembly according to claim 1, wherein the first wear-resistant member is configured to be compressed with respect to the accommodating area by the rotation of the handle with respect to the handle housing, and wherein a range of volume compression ratios is between 60% and 80%.

4. The handle assembly according to claim 1, wherein the handle assembly further comprises an absorber which is disposed between the handle rod and the through-hole and is configured to reduce rotational friction between the handle rod and the through-hole.

5. The handle assembly according to claim 1, wherein the handle rod is provided with an annular recess at the position opposite to the transition part, and the annular recess and the transition part define the accommodating area together.

6. A faucet, comprising:
a handle assembly as claimed in claim 1;
a panel having an opening;
a body assembly comprising a body, a valve member accommodated in the body and a valve cover being engaged with the body and forming an accommodating cavity for receiving the valve member together with the body;
wherein the handle housing is adjustably engaged with the valve cover by extending through the opening of the panel, and the handle rod is engaged to the valve member to control the opening or closure of the valve member.

7. The faucet according to claim 6, wherein a valve lever of the valve member is engaged to the handle rod and configured to rotate following the handle rod to control the shut off of the fluid in the body.

8. The faucet according to claim 7, wherein the valve lever is connected to the handle rod by a spline.

9. The faucet according to claim 6, wherein the through-hole is configured to have an inclined angle ranging from 30° to 60° with respect to the inner wall at the transition position.

10. The faucet according to claim 6, wherein the first wear-resistant member is configured to be compressed with respect to the accommodating area by the rotation of the handle with respect to the handle housing, and wherein a range of volume compression ratios is between 60% and 80%.

11. The faucet according to claim 6, wherein the handle assembly further comprises an absorber which is disposed between the handle rod and the through-hole and is configured to reduce rotational friction between the handle rod and the through-hole.

12. The faucet according to claim 6, wherein the handle rod is provided with an annular recess at the position opposite to the transition part, and the annular recess and the transition part define the accommodating area together.

* * * * *